US009480127B2

(12) United States Patent
De Groot et al.

(10) Patent No.: US 9,480,127 B2
(45) Date of Patent: Oct. 25, 2016

(54) AMBIENT LIGHTING CONTROL SYSTEM (75) Inventors: Bastiaan De Groot, London (GB); Raj Dayal Natarajan, San Diego, CA (US); Henricus Antonius Gerardus Van Vugt, Helmond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 194 days.

(21) Appl. No.: 14/241,507

(22) PCT Filed: Sep. 4, 2012

(86) PCT No.: PCT/IB2012/054550
§ 371 (c)(1),
(2), (4) Date: Feb. 27, 2014

(87) PCT Pub. No.: WO2013/038295
PCT Pub. Date: Mar. 21, 2013

(65) Prior Publication Data
US 2014/0217261 A1  Aug. 7, 2014

Related U.S. Application Data (60) Provisional application No. 61/533,284, filed on Sep. 12, 2011.

(51) Int. Cl.
*H05B 37/02* (2006.01)
*E06B 9/24* (2006.01)
(Continued)

(52) U.S. Cl.
CPC ............ *H05B 37/0218* (2013.01); *E06B 9/24* (2013.01); *G01J 1/00* (2013.01); *G05D 25/02* (2013.01); *H05B 37/0272* (2013.01); *A47H 2005/025* (2013.01); *Y02B 20/46* (2013.01)

(58) Field of Classification Search
CPC . H05B 37/0218; H05B 37/0272; E06B 9/24; G01J 1/00; G05D 25/02; A47H 2005/025; Y02B 20/46
USPC ....... 250/203.4, 214 AL, 205, 214 C, 214 R, 250/203.1, 203.3, 214 SW; 315/153, 154, 315/291, 294, 299–302, 307; 345/63, 345/76–81, 207; 126/569, 572–578, 126/600–603, 605–607; 136/243, 244, 252, 136/254
See application file for complete search history.

(56) References Cited

U.S. PATENT DOCUMENTS 6,144,161 A    11/2000  Kimmich et al.
7,148,628 B2   12/2006  McCavit et al.
(Continued)

FOREIGN PATENT DOCUMENTS

JP    2008011279 A    1/2008
JP    2010318808 A    9/2010
(Continued)

OTHER PUBLICATIONS

Farhan Simjee et al: "Everlast: Long-Life, Supercapacitor-Operated Wireless Sensor Node", Low Power Electronics NAD Design, 2006 ISLPED Oct. 1, 2006, pp. 197-202, XP031115550.
(Continued)

*Primary Examiner* — Georgia Y Epps
*Assistant Examiner* — Don Williams
(74) *Attorney, Agent, or Firm* — Meenakshy Chakravorty (57) ABSTRACT In one embodiment there is provided an ambient lighting control system 1 comprising a controller (2) and a sensor node (3a). The sensor node (3a) comprises an arrangement including a light energy collecting element (8) such as a solar cell, an energy storage element (9) and a transmitter (11). The collecting element (8) charges the storage element (9). The transmitter (11) is arranged to transmit signals to the controller (2) using energy stored by the energy storage element (9), wherein the number of signals provided during a time interval to the controller (2) is proportional to a light intensity at the light energy collecting element (8). The controller (2) may thus output a control signal C for controlling an amount of ambient lighting, wherein the control signal is based on the determined number of received signals.

8 Claims, 2 Drawing Sheets (51) Int. Cl.
   *G01J 1/00*      (2006.01)
   *G05D 25/02*    (2006.01)
   *A47H 5/02*      (2006.01)

(56) References Cited

U.S. PATENT DOCUMENTS

2001/0043050 A1* 11/2001 Fisher, Jr. ............. H02J 7/0068
                                                              320/101
2002/0013679 A1   1/2002 Petite
2011/0187271 A1   8/2011 Buws et al.
2013/0206212 A1*  8/2013 Etyemezian ........ H01L 31/0522
                                                              136/248

FOREIGN PATENT DOCUMENTS

WO    20060091932 A2    8/2006
WO     2010128422 A1   11/2010
WO     2010140094 A1   12/2010

OTHER PUBLICATIONS

Arun Venkatraman et al; "A Novel Control Algorithm for Regulating the Tinting of Electrochromic Windows", pp. 1-20, 2005.
Dr. Wolf: "Optical Sensors—Ambient Light Sensors (ALS)", Silonex, Nicera, Everlight, pp. 1-2, 2002.

* cited by examiner

AMBIENT LIGHTING CONTROL SYSTEM

FIELD OF THE INVENTION

The invention relates to an arrangement for an ambient lighting control system, a controller for an ambient lighting control system, an ambient lighting control system and methods thereof.

BACKGROUND OF THE INVENTION

Automation of light is used widely in many indoor environments and this is set to grow in the coming years. Automated systems for light intensity control which monitor the intensity of both natural and artificial light present in the environment are known in the art. Known systems for controlling the amount of ambient lighting typically use a light sensor to sense the light intensity with a certain sampling frequency, wherein the sampled data is processed using an analog-to-digital converter (ADC) and then sent to a central node using a microcontroller and radio frequency (RF) module. In addition, a battery or an electric line is used to supply power to the system.

SUMMARY OF THE INVENTION

It is an object of the present invention to provide an improvement over the prior art ambient lighting control systems. In particular it is an object to enable an ambient lighting control system providing reliable operation at various levels of light intensity and which may be manufactured and maintained in a simple and cost-efficient manner.

According to a first aspect of the invention, these and other objects are achieved by an arrangement for an ambient lighting control system. The arrangement includes an energy storage element and a light energy collecting element arranged to charge the energy storage element. The arrangement further comprises a transmitter arranged to provide signals to a controller of the ambient lighting control systems using energy stored by the energy storage element. According to the inventive first aspect the number of signals provided during a time interval to the controller is proportional to the intensity of the light received by the light energy collecting element during the time interval. The arrangement may thus indicate the intensity of the ambient light by the rate of signal transmissions. The controller receiving the signals may thus control the amount of ambient lighting in a simple manner on the basis of the rate at which signals are received from the transmitter. Consequently, sampling and subsequent digitization of the light intensity (e.g. by means of an Analog-to-Digital-Converter, ADC), and encoding of the light intensity data into the signal by the transmitter may be avoided. This advantageously reduces both the complexity of the arrangement as well as the power requirements thereof.

The transmitter is arranged to provide the signals using energy stored by the energy storage element. The need for additional energy sources in the arrangement may thereby be reduced. In fact the arrangement may be completely self-supporting in terms of energy, thereby reducing maintenance requirements. The time required for storing an energy amount at the energy storage element which is sufficient for powering the transmitter during transmission of the signals may depend on the charging rate of the energy storage element and hence on the intensity of the light incident on the light energy collecting element. Consequently, the rate at which the transmitter may provide the signals may be proportional to the intensity of the ambient light in the environment in which the energy collecting element is provided.

According to one embodiment the arrangement further comprises switching circuitry arranged to connect the energy storage element to the transmitter in response to an energy stored by the energy storage element exceeding a threshold energy. The transmitter is in turn arranged to provide the signals to the controller of the ambient lighting control system, in response to becoming connected with the energy storage element. This embodiment provides a simple and efficient implementation of varying the transmission rate on the basis of the light intensity. Upon being connected to the energy storage element the transmitter may receive at least a portion of the energy stored by the storage element and transmit the signal using the received energy. The energy stored by the energy storage element may thus be reduced to an amount falling below the threshold energy. By the light energy collecting element the energy storage element will after some time be re-charged to an energy exceeding the threshold energy wherein the transmitter may transmit yet another signal to the controller. As discussed above the time it takes for the energy storage element to recharge may depend on the intensity of the light incident on the light energy collecting element.

According to one embodiment the switching circuitry is arranged to disconnect the energy storage element from the transmitter in response to the transmitter providing the signal to the controller. Thus after transmission of the signal, the transmitter will not consume any energy from the energy storage element. The energy storage element may thereby be recharged to a level exceeding the threshold energy more quickly.

One way of having the switching circuitry to disconnect the energy storage element from the transmitter in response to the transmitter providing the signal to the controller is to arrange the switching circuitry to disconnect the energy storage element from the transmitter in response to an energy stored by the energy storage element falling below a second threshold energy, which is lower than the above-mentioned (first) threshold energy. The state of the switching circuitry may thereby be conveniently determined by simply monitoring the energy amount stored at the energy storage element. The energy difference between the first threshold energy and the second threshold energy determines the amount of energy available for the transmitter.

According to one embodiment the transmitter is arranged to begin a transmission of the signal in response to being connected to the energy storage element, and end the transmission of the signal in response to being disconnected from the energy storage element. This enables a simple configuration of the transmitter. Moreover, if used in combination with the previous embodiment the operation of the transmitter may be controlled on the basis of the energy amount stored at the energy storage element. This may simplify the design of the arrangement.

According to one embodiment the transmitter is arranged to, in response to being connected to the storage element, receive at least a portion of the energy stored by the storage element and transmit the signal using the received energy. The transmitter may thereby powered by the storage element for transmission of the signals to the controller.

According to one embodiment a power consumption of the transmitter exceeds a charging rate of the energy storage element. It may thus be ensured that the transmission of the signal reduces the energy stored at the energy storage element even during continuous charging of the energy storage element by the light energy collecting element. This embodiment thus reduces the need for implementing control logic (in either the arrangement or in the controller) for handling an otherwise possible situation wherein the transmitter would continuously transmit a signal to the controller.

According to one embodiment the arrangement includes a sensor node wherein the light energy collecting element is comprised in the sensor node.

According to one embodiment the arrangement is comprised in a sensor node. According to this embodiment there is provided a sensor node comprising the energy storage element, the light energy collecting element, the transmitter and the switching circuitry. An ambient lighting control system may thereby be conveniently deployed by placing a desired number of such sensor nodes in an environment in which control of the ambient lighting is desired. Each such sensor node may thus be arranged to transmit a signal to the controller of the ambient lighting control system.

According to one embodiment the transmitter is arranged to periodically attempt to transmit a signal to the controller. On a condition that an energy stored by the storage element exceeds a threshold energy (e.g. the energy required by the transmitter for transmitting a signal to the controller) the transmitter may transmit the signal. On a condition that an energy stored by the storage element falls below the threshold energy no signal may be transmitted. This embodiment provides a simple way to limit the amount of signals transmitted even during periods of high light intensity, i.e. by configuring the periodicity of the transmission attempts, while maintaining the feature of providing signals at a rate which depends on the light intensity.

According to a second aspect there is provided a controller for an ambient lighting control system. The controller comprises a receiver arranged to receive signals from a transmitter associated with a light energy collecting element of the ambient lighting control system (or a sensor node of the system as the case may be). The controller also comprises circuitry arranged to determine a number of signals received from the transmitter during a time interval and output a control signal for controlling an amount of ambient lighting. More specifically the control signal is based on the determined number of received signals. The inventive idea to control the amount of ambient lighting based on the number of received signals provides inter alia the advantage of reliable control even in conditions wherein the available light intensity for powering the transmission of signals from the transmitter is low. The reason for this is that even the absence of received signals (resulting in a small number of signals received at the controller) indicates the prevailing ambient lighting condition to the controller, i.e. that the ambient light intensity at the light energy collecting element is low. Conversely, if the ambient light intensity at the sensor is high the controller may receive a large number of signals, thus indicating to the controller that the ambient light intensity at the light energy collecting element is high. Moreover, the controller may be implemented in a simple manner since no post-processing of received signals for extracting coded data there from is required. The controller may simply count the number of signals received.

The controller may output the control signal to one or more controlled devices such as one or more electric light sources or electrically controllable blinds, the state of which may influence the amount of ambient light in an environment.

The controller may be arranged to output a control signal for reducing an amount of ambient lighting on a condition that the determined number of received signals exceeds a first threshold, and output a control signal for increasing an amount of ambient lighting on a condition that the determined number of received signals falls below a second threshold.

Alternatively, the controller may be arranged to estimate a prevailing amount of ambient light using the determined number of received signals, output a control signal for reducing an amount of ambient lighting on a condition that the estimated amount of ambient light exceeds a first threshold value, and output a control signal for increasing an amount of ambient lighting on a condition that the estimated actual ambient light level falls below a second threshold value. For example a user of the system may input the desired amount of ambient light into the controller. The controller may then output control signals for controlling the amount of ambient light in accordance with the desired amount.

According to a third aspect there is provided an ambient lighting control system comprising the arrangement of the first aspect (or any embodiments thereof) and the controller of the second aspect (or any embodiments thereof). The details and advantages discussed above in relation to the first and second embodiments apply correspondingly to the third aspect.

According to a fourth aspect there is provided a method performed in an ambient lighting control system. The method comprises charging an energy storage element using a light energy collecting element. The method further comprises transmitting signals to a controller of the ambient lighting control system wherein the number of signals transmitted to the controller during a time interval is proportional to a light intensity at the light energy collecting element during the time interval.

According to one embodiment the method may further comprise connecting, in response to a stored energy exceeding a threshold energy, a transmitter to the energy storage element and providing a signal from the transmitter to the controller. For example when the energy storage element is charged to a predetermined threshold voltage the transmitter may be switched on. The transmitter may then transmit a signal to the controller.

According to one embodiment the method further comprises disconnecting the transmitter from the energy storage element in response to the transmitter providing the signal to the controller. The connecting and disconnecting the transmitter from the energy storage element may for example comprise: connecting the transmitter to the energy storage element in response to a stored energy exceeding a first threshold energy, and disconnecting the transmitter from the energy storage element in response to a stored energy falling below a second threshold energy. The method may further comprise, in response to the connection of the transmitter to the energy storage element, initiating transmission of the signal to the controller, using at least a portion of the stored energy during transmission of the signal, and, in response to the disconnection of the transmitter from the energy storage element, terminating transmission of the signal to the controller. According to one embodiment the method further comprises: charging the storage element at a first rate, and discharging the storage element at a second rate during transmission of the signal, wherein the second rate exceeds the first rate.

The details and advantages discussed in relation to the first aspect and the embodiments thereof apply correspondingly to the fourth aspect and the embodiments thereof. The discussion will hence not be repeated here. Instead reference is made to the above discussion.

According to a fifth aspect there is provided a method performed in an ambient lighting control system. The method comprises receiving, during a time interval, signals from a transmitter associated with a light energy collecting element of the ambient lighting control system. The method also comprises determining a number of signals received from the transmitter during the time interval and outputting a control signal for controlling an amount of ambient lighting, wherein the command is based on the determined number of received signals.

According to one embodiment the method further comprises: on a condition that the determined number of received signals exceeds a first threshold, outputting a control signal for reducing an amount of ambient lighting, and on a condition that the determined number of received signals falls below a second threshold, outputting a control signal for increasing an amount of ambient lighting. According to one embodiment the method further comprises: estimating a prevailing amount of ambient light using the determined number of received signals, on a condition that the estimated amount of ambient light exceeds a first threshold value, outputting a control signal for reducing an amount of ambient lighting, and on a condition that the estimated amount of ambient light falls below a second threshold value, outputting a control signal for increasing an amount of ambient lighting.

The details and advantages discussed in relation to the second aspect and the embodiments thereof apply correspondingly to the fifth aspect and the embodiments thereof. The discussion will hence not be repeated here. Instead reference is made to the above discussion.

According to a sixth aspect there is provided method of controlling a light intensity in an ambient lighting control system. The method comprises, at a sensor node of the system, charging an energy storage element using a light energy collecting element, and transmitting signals to a controller of the system using energy stored by the energy storage element, wherein the number of signals transmitted to the controller during a time interval is proportional to a light intensity at the light energy collecting element. The method further comprises, at the controller of the system, receiving, during a time interval, signals from the transmitter associated with the sensor node, determining a number of signals received from the transmitter during the time interval, and outputting a control signal for controlling an amount of ambient lighting, wherein the command is based on the determined number of received signals.

The details and advantages discussed in relation to the first to fifth aspects, and the embodiments thereof, apply correspondingly to the sixth aspect and the embodiments thereof. The discussion will hence not be repeated here. Instead reference is made to the above discussion.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention wherein like reference numerals refer to like elements throughout unless stated otherwise.

DETAILED DESCRIPTION OF THE EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
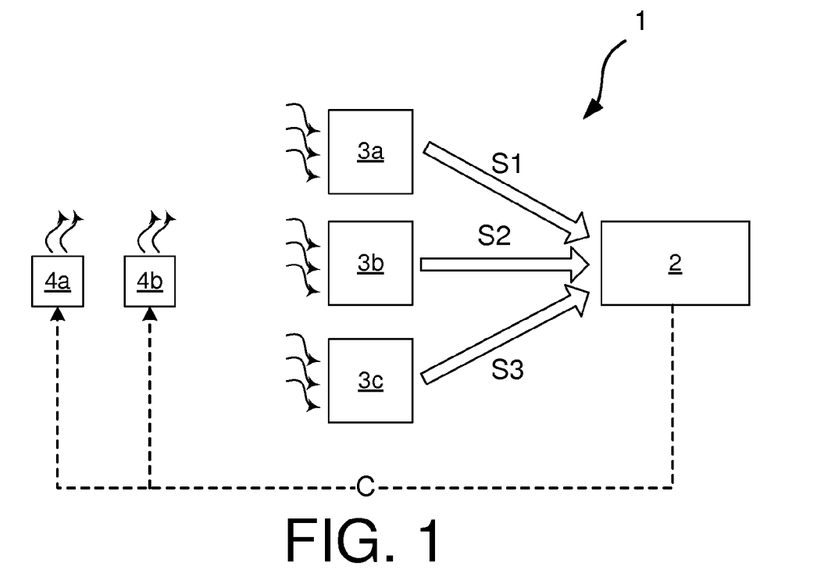
FIG. 1 schematically illustrates a system in accordance with an embodiment.

FIG. 1 schematically illustrates an ambient lighting control system 1. The system 1 includes one or more sensor nodes (which in FIG. 1 are represented by sensor nodes 3a, 3b, and 3c) and a controller 2. The controller 2 may be referred to as a control node 2 of the system. The controller 2 may communicate with one or more controlled devices (which in FIG. 1 are represented by elements 4a, 4b). A controlled device may be a light source. A controlled device may be an electrically controllable blind (such as a window blind), a curtain, an awning or the like. More generally, the controlled device may be any device which may be operated to control an amount of ambient light in an (indoor or outdoor) environment in which the sensor nodes (3a, 3b, and 3c) are provided. The controller 2 may provide a control signal C to the controlled devices 4a, 4b, wherein the control signal C is based on radio frequency (RF) signals S1, S2, S3 received from the sensor nodes 3a, 3b, 3c as will be described in detail below.

Figure 2:
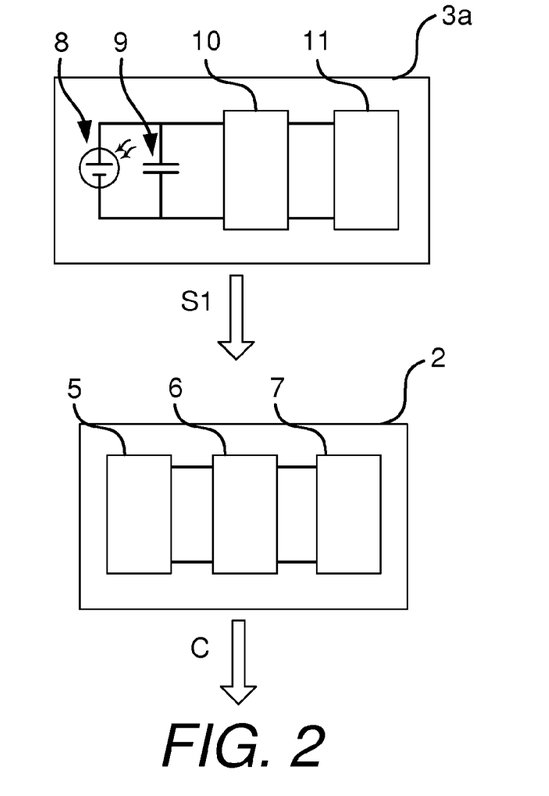
FIG. 2 schematically illustrates a sensor node and a controller of the system.

FIG. 2 illustrates the controller 2 and one of the sensor nodes 3a in greater detail. The discussion referring to the sensor node 3a applies correspondingly to the other sensor nodes 3b, 3c. The controller 2 comprises a receiver 5. The receiver 5 is arranged to receive RF signals transmitted wirelessly by a transmitter associated with any one of the sensor nodes 3a, 3b, 3c. The controller 2 comprises circuitry for analyzing the received signals and outputting control signals C to the controlled devices 4a, 4b. The circuitry is connected to the receiver 5. In FIG. 2 the circuitry is formed by a counter 6 and a signal generator 7. The counter 6 and the signal generator 7 may for example be implemented by a respective integrated circuit. The counter 6 is connected to the signal generator 7. The counter 6 is arranged to determine a number of signals S1, S2, S3 received from the sensor nodes 3a, 3b, and 3c by the receiver 5 during a time interval of a set duration. The counter 6 is arranged to provide the determined number of signals to the signal generator 7. The signal generator 7 is arranged to output a control signal C to the controlled devices 4a, 4b based on the determined number of received signals as will be described in greater detail below. In one scenario, the controlled devices 4a, 4b include or are associated with a respective RF receiver arranged to receive control signals C from the controller 2. In such a scenario the controller 2 may include an RF transmitter arranged to transmit control signals C output by the signal generator 7 as RF control signals. In another scenario, the controlled devices 4a, 4b are connected by wires to the controller 2. In such a scenario an output of the signal generator 7 may be connected to the wires wherein the control signals C may be sent to the controlled devices 4a, 4b via the wired connections.

The sensor node 3a schematically illustrated in FIG. 2 comprises an arrangement of parts. The arrangement comprises a light energy collecting element 8 in the form of a solar cell or photovoltaic cell, an energy storage element 9 in the form of an electrolytic capacitor, switching circuitry 10 and a transmitter module or transmitter 11. The storage element 9 is connected to the collecting element 8. The collecting element 8 is arranged to convert light incident on the collecting element 8 into electric energy. The collecting element 8 is arranged to charge the storage element 9 with the electric energy. In FIG. 2 one collecting element 8 is shown. However the arrangement may include a plurality of light energy collecting elements connected to the storage element 9. For example the arrangement may include a plurality of solar cells connected in parallel with the storage element 9.

The transmitter 11 is connected to the storage element 9 via the switching circuitry 10. The switching circuitry 10 is arranged to electrically connect the storage element 9 to the transmitter 11 when an energy stored by the storage element 9 exceeds a threshold energy (which may referred to as the "connect-threshold"). The switching circuitry 10 may for example include a relay. The relay may be of a type known per se, such as an electromechanical, an electromagnetic (e.g., Reed relay), electro-thermal (e.g., bimetal) or of a solid-state type. Further implementations of the switching circuitry 10 will be discussed below. Upon becoming connected to the storage element 9, the transmitter 11 is arranged to wirelessly transmit an RF signal S1 to the controller 2 for adjusting the amount of ambient lighting. The transmitted signal S1 may include a single pulse or a train of pulses. The signal S1 may also be a continuous transmission of a predetermined duration. The switching circuitry 10 is further arranged to electrically disconnect the storage element 9 from the transmitter 11 in response to the transmitter 11 transmitting the signal S1 to the controller 2.

The system 1 will now be described in use. It is assumed that initially, the storage element 9 is uncharged, i.e. does not store any energy, and that the state of the switching circuitry 10 is such that the storage element 9 is disconnected from the transmitter 11 (i.e. the switching circuitry 10 is in an open state). Light incident on the collecting element 8 is converted to electric energy which is stored by the storage element 9. When the storage element 9 stores an energy amount exceeding the connect-threshold the switching circuitry 10 changes to a closed state wherein the transmitter 11 is connected to the storage element 9. Once powered by the storage element 9 the transmitter 11 transmits a signal S1 to the controller 2. In response to transmission of the signal S1 the switching circuitry 10 changes to the open state wherein the transmitter 11 is disconnected from the storage element 9.

The transmission of the signal S1 results in at least a partial discharge of the storage element 9. By the discharge, the energy stored by the storage element 9 falls below the connect-threshold of the switching circuitry 10. After some time (which depends on the amount of ambient light) the collecting element 8 has re-charged the storage element 9 such that the energy amount stored by the storage element 9 once again exceeds the connect-threshold. In response the switching circuitry 10 changes to the closed state wherein yet another signal S1 is transmitted by the transmitter 11 to the controller 2.

The charging rate of the storage element 9 is directly proportional or at least proportional to the intensity of the light incident on the collecting element 8. Thus, the charging rate is proportional to the intensity of ambient light in the environment in which the sensor node 3a is positioned. As a result the number of signals S1 transmitted from the sensor node 3a to the controller 2 during a time interval of a given length (i.e. the rate of transmission) will be proportional to the amount of ambient light. The controller 2 makes use of this and the counter 6 accordingly counts the number of signals S1 received from the sensor node 3a during a time interval and provides this number to the signal generator 7. After providing the number to the signal generator 7 the counter 6 may be reset. Based on the number the signal generator 7 may output a control signal C to the controlled devices 4a, 4b instructing them to reduce or increase the amount of ambient lighting. In case the controlled devices 4a, 4b are light sources the control signal C may instruct them to reduce or increase the amount of lighting by lowering or increasing the intensity of the light output. In case the controlled devices 4a, 4b are window blinds, awnings or the like the control signal C may instruct them to close/open or lower/retract, respectively, partially or fully wherein the amount of ambient light in the environment may decrease or increase.

The signal generator 7 may generate the control signal C in accordance with a look-up-table (LUT). The LUT may include a mapping between the determined number of received signals and the type or content of the control signal to be generated. For example the table may indicate to the controller 2 that a count of ten signals means that the amount of ambient light should be increased, a count of fifteen that the amount of ambient light is acceptable, and a count of twenty that the amount of ambient light should be decreased. Optionally, the controller 2 may be arranged to estimate a prevailing amount of ambient light from the determined number of received signals (e.g. using a LUT). The controller 2 may compare the estimate with a desired amount of ambient lighting (e.g. provided by a user at an input of the controller 2). On a condition that the estimated amount of ambient light exceeds the desired amount (by more than a tolerance value) the controller 2 may output a control signal C for decreasing the amount of ambient light. On a condition that the estimated amount of ambient light falls below the desired amount (by more than a tolerance value) the controller 2 may output a control signal C for increasing the amount of ambient light. For a given amount of ambient lighting, i.e. a given lighting intensity incident on the collecting element 8, the rate at which the transmitter 11 may transmit signals S1 to the controller 2 depends on the conversion efficiency of the collecting element 8, the charging rate of the storage element 9 and the power consumption of the switching circuitry 10 and the transmitter 11.

The duration of the time interval during which the signals S1 are counted may be different in different applications and/or environments. By decreasing the length of the time interval control signals C may be output to the controlled devices 4a, 4b more frequently. Conversely, by increasing the length of the time interval control signals C may be output to the controlled devices 4a, 4b less frequently. Increasing the time interval also enables signals S1 to be counted during a longer time. Thereby the resolution of the feedback from the sensor node 3a may be increased.

The signals S1, S2, S3 from the sensor nodes 3a, 3b, 3c may be coded or include an identity enabling the controller 2 to distinguish between signals received from the different sensor nodes 3a, 3b, 3c. Thereby the controller 2 may keep a separate counter for each of the sensor nodes and output different control signals C based on each count. This may be advantageous in case the sensor nodes 3a, 3b, 3c are spaced in the environment such that for example the controlled device 4a may influence the amount of ambient light only at the sensor nodes 3a and 3b whereas the controlled device 4b may influence the amount of ambient light only at the sensor node 3c. However the controller 2 may also maintain a common counter for all sensor nodes 3a, 3b, 3c of the system 1 wherein a common control signal C may be provided to the controlled devices 4a, 4b.

As described above the switching circuitry 10 is arranged to disconnect the transmitter 11 from the storage element 9 in response to transmitting the signal S1 to the controller 2. This may be achieved by arranging the switching circuitry 10 to disconnect the storage element 9 from the transmitter in response to an energy stored by the storage element 9 falling below a threshold energy (which may be referred to as a "disconnect-threshold"). During transmission of the signal S1, the transmitter 11 will discharge the storage element 9. As the energy stored at the storage element 9 falls below the disconnect-threshold the switching circuitry 10 disconnects the storage element 9 from the transmitter 11. In response, the transmission of the signal S1 ends. The disconnect-threshold is lower than the connect-threshold. The difference between the connect- and disconnect-threshold determines the amount of energy available to the transmitter 11 for transmission of the signal S1. The switching circuitry may for example include a volt meter monitoring the voltage over the storage element 9 (and analogously the energy stored by the storage element 9). In response to the monitored voltage exceeding the connect-threshold the switching circuit 9 may change to the closed state wherein the transmitter 11 is connected to the storage element 9. The transmitter 11 stays connected to the storage element 9 until the monitored voltage falls below the disconnect-threshold. In response to the monitored voltage falling below the disconnect-threshold the switching circuit 9 may change to the open state wherein the transmitter 11 is disconnected from the storage element 9.

In an alternative implementation, the transmitter 11 may be arranged to provide a control signal to an input of the switching circuitry 10 when the signal S1 has been transmitted wherein the control signal causes the switching circuitry 10 to disconnect the transmitter 11 from the storage element 9. In this case no disconnect-threshold is necessary since the switching circuitry 10 will remain closed until the control signal is received from the transmitter 11.

Figure 3:
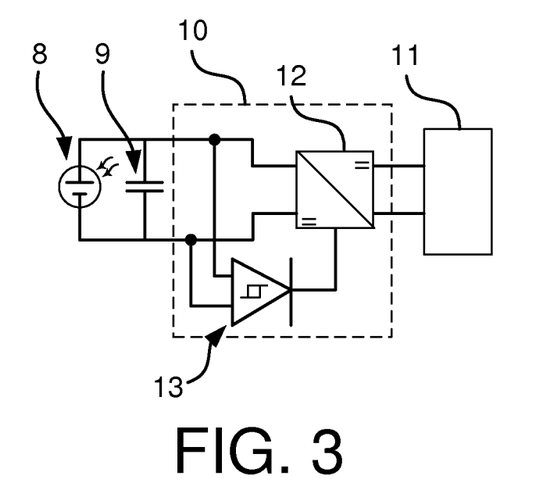
FIG. 3 illustrates an example of a circuit implementation of the sensor node.

A possible circuit implementation for the sensor node 3a is illustrated in FIG. 3. The switching circuitry 10 includes a DC-to-DC converter 12 and a Schmitt trigger 13. The input of the DC-to-DC converter 12 is connected to the storage element 9. The output of the DC-to-DC converter 12 is connected to the transmitter 11. The DC-to-DC-converter 12 is arranged to receive a first voltage as an input voltage from the storage element 9 and provide a second voltage as an output voltage to the transmitter 11. Depending on the configuration of the DC-to-DC converter 12 and the charging level of the storage element 9, the output voltage may be higher or lower than the input voltage. The input of the Schmitt trigger 13 is connected to the storage element 9. The output of the Schmitt trigger 13 is connected to an input of the DC-to-DC converter 14 for receiving an enabling signal. The Schmitt trigger 13 is arranged to output the enabling signal when the voltage at the storage element 9 exceeds a first threshold (i.e. the connect-threshold) and disable the enabling signal when the voltage at the storage element 9 falls below a second threshold (i.e. the disconnect-threshold). The DC-to-DC converter 12 is arranged to turn on in response to receiving an enabling signal from the Schmitt trigger 13 and remain active while receiving the enabling signal. The DC-to-DC converter 12 is arranged to remain inactive and/or turn off in response to not receiving an enabling signal from the Schmitt trigger 13. When the DC-to-DC converter 12 turns on the transmitter 11 becomes connected to the storage element 9. When the DC-to-DC converter 12 turns off the transmitter 11 becomes disconnected from the storage element 9. The magnitudes of the connect- and disconnect-thresholds may be chosen such that the DC-to-DC converter 12 is able to output a voltage for proper powering of the transmitter 11 during transmission of a signal to the controller 2. It is to be noted that this circuit implementation only constitutes one possible implementation and that others are possible within the scope of the claims. For example although the Schmitt trigger 13 is illustrated as a separate component from the DC-to-DC converter 12, the Schmitt trigger 13 may also be included in a same circuit element or integrated circuit as the DC-to-DC converter 12.

The person skilled in the art realizes that the present invention by no means is limited to the preferred embodiments described above. On the contrary, many modifications and variations are possible within the scope of the appended claims. For example, although in the above the switching circuitry 10 has been illustrated as physically separated from the transmitter 11, the switching circuitry 10 may be comprised in the transmitter 11, e.g. in a same circuit element or integrated circuit as the transmitter 11. In a further example, instead of RF signals, a sensor node may include a transmitter arranged to transmit optical signals to a controller. The controller may accordingly include a receiver arranged to receive optical signals from the transmitter. The transmitter may for example be a photo diode. The receiver may for example be a photo detector. The transmitter and the receiver may transmit and receive infra red (IR) signals or signals in some other part of the spectrum.

Furthermore, instead of a solar cell, the light energy collecting element may be a photoelectric device, such as a photo diode. Instead of a capacitor a re-chargeable battery may be used as energy storage element. Moreover, in the illustrated embodiments the arrangement including the collecting element 8, the storage element 9, the switching circuitry 10 and the transmitter 11 is comprised in the sensor node 3a. However, according to alternative embodiments all the components need not be included in a single sensor node 3a. According to one such alternative embodiment the system may include an arrangement comprising one or more a sensor nodes, each including a solar cell. The further elements of the arrangement may further comprise an energy storage element, a transmitter, and switching circuitry for connecting the energy storage element to the transmitter module. These further elements may form a subassembly which is common to the one or more sensor nodes. For example, the subassembly may be included in a common enclosure and the solar cells of the one or more sensor nodes may be connected to the subassembly and more specifically to the energy storage element of the sub-assembly.

In a further alternative embodiment the transmitter is arranged to periodically attempt to transmit a signal to the controller. On a condition that an energy stored by the storage element exceeds a threshold energy (e.g. the energy required by the transmitter for transmitting a signal to the controller) the transmitter may transmit the signal. On a condition that an energy stored by the storage element falls below the threshold energy no signal may be transmitted. If the light intensity is high there may be enough stored energy at each transmission attempt. If the light intensity is lower there may be enough stored energy at only a portion of the transmission attempts. This embodiment may be implemented using a similar arrangement as in FIG. 2. For example the switching circuitry 10 may be arranged to periodically connect the transmitter 11 to the storage element 9. The switching circuitry 10 may for example be powered by a separate battery. Since the power required for operating the switching circuitry 10 in this manner may be made significantly smaller than the power required by the transmitter 11 to transmit the signals the discharging of the battery may be comparably slow.

Optionally, the transmitter 11 may include in each transmitted signal an indication of the amount of energy stored in the storage element 9. The indication may indicate the energy amount in excess of the threshold energy. The indication may indicate the energy amount stored in the storage element 9 before transmission of the signal. The indication may indicate the voltage over the storage element 9. The sensor node 3a may include a volt meter arranged to measure the voltage over the storage element 9 and an analog-to-digital converter arranged to convert the measured voltage into digital data which the transmitter may encode into the signal to be transmitted. The controller 2 may in response to receiving the signal extract the indicated energy amount from the signal. The controller 2 may generate the control signal based on both the number of signals received during a time interval and the energy amount indication. The energy amount indication may improve the responsiveness of the controller. For example, a large excess energy in combination with a low signal rate may indicate to the controller 2 that the light intensity has increased rapidly from a previously low level. Conversely, a small or zero excess energy in combination with a high signal rate may indicate to the controller 2 that the light intensity has dropped rapidly from a previously high level. The controller 2 may hence output an appropriate control signal C in response to the received signal without awaiting further signals from the sensor node. This optional feature may be advantageous in usage scenarios where slightly higher power requirements of the sensor node are acceptable, for example in environments where the light intensity frequently is high.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

To further facilitate understanding, the operation of a system in accordance with an example will now be described. The system of the example comprises a sensor node having a solar cell, and an electrolytic capacitor as storage element. The system also comprises a radio frequency (RF) module as transmitter module, and switching circuitry. The system further comprises a voltage conditioning circuit comprising a DC-to-DC converter.

According to the example, when the sensor node is put into an environment, the solar cell is used to charge the capacitor to a sufficient level to start the DC-to-DC converter. The solar cell may produce an output voltage of 2.7 V and an output current in the order of 150 microamperes at a light intensity of 800 lux, which may be a typical average indoor light intensity level in an office. A number of solar cells can be connected in parallel to increase the output current level. According to the example the DC-to-DC converter needs a start up current of 4 to 5 milliamperes which is higher than what the solar cell produces. The electrolytic capacitor stores electrical charge until it has accumulated enough electrical charge to produce an electrical current that can start the DC-to-DC converter. A switching circuit is used to turn the DC-to-DC converter on when a predetermined amount of electrical charge has been stored in the capacitor. To achieve this, the DC-to-DC converter has a built-in functionality in the form of a shut down pin that lets the DC-to-DC converter switch on only if it is provided with a voltage of over 1.5 V.

According to the example, the switching circuitry comprised in the system consists of a LMC555 timer and a NMOSFET which are used together to switch the circuit on when necessary. The timer is used in a Schmitt trigger configuration and is connected to the active low "shutdown" pin of the DC-to-DC converter. This ensures that the DC-to-DC converter switches on only after a certain voltage level has been reached on the capacitor.

To summarize the operation of the example system, the electrolytic capacitor keeps charging till it reaches a predetermined threshold voltage. When this threshold voltage is reached, the switch turns on the connection to the DC-to-DC converter which turns the RF module on. The RF module sends a message and the voltage on the capacitor falls below a value which results in the switch being turned off. Then, the capacitor needs to charge up again to the threshold voltage after which another message is sent. The charging time of the capacitor is dependent on the intensity of light. The frequency of the messages depends on how fast the charging time is. Therefore, the number of messages sent is directly proportional to the intensity of light in the environment, which is the principle on which this example system works.

Thus, according to a more general example there is provided a system for controlling the amount of ambient lighting, the system comprising: a sensor node comprising a solar cell, an energy storage element, a transmitter module, switching circuitry for connecting the energy storage element to the transmitter module, and a controller, wherein the sensor node is arranged to charge the energy storage element, wherein the transmitter module is arranged to provide, upon connection with the energy storage element, an output signal to the controller for adjusting the amount of ambient lighting, and wherein the switching circuitry is arranged to connect the energy storage element to the transmitter module when a predetermined amount of charge is stored on the energy storage element. There is also provided a method for controlling the amount of ambient lighting, the method comprising the steps of: positioning one or more solar cells in a space, using the one or more solar cells to charge an energy storage element to a predetermined threshold voltage, switching on a transmitter module when the energy storage element is charged to the predetermined threshold voltage, providing an output signal from the transmitter module to a controller for adjusting the amount of ambient lighting.

According to a further general example there is provided a system for controlling the amount of ambient lighting that comprises an energy storage element (such as an electrolytic capacitor) and a solar cell (also known as a photovoltaic cell) for charging the storage element. The system further comprises a transmitter module (such as an RF module), and switching circuitry. When a predetermined amount of electrical charge has been stored on the storage element, the switching circuitry turns on and connects the storage element to the transmitter module that provides an output signal to the system for adjusting the amount of ambient lighting. The electrical charge on the storage element then falls below the predetermined amount which results in the switch being turned off. When the storage element charges up to the predetermined value again, another output signal is sent. The charging time of the storage element is dependent on the intensity of light that is incident on the solar cell. The frequency wherein output signals are sent depends on the charging time so that the number of output signals sent is directly proportional to the intensity of light.

The system according to the further general example does not have to use an ADC and may thereby become more efficient and smaller with lesser components, reducing the overall bill of materials and maintenance cost. Based on the number of output signals sent by the transmitter module, the system may know the light intensity in the environment and can adjust it accordingly. Not having to use an ADC may significantly reduce the energy that is required for one transmission as an ADC may consume a high power. This may in turn reduce the energy requirement of light sensing and control circuitry and may thus result in a far more efficient and a smaller system, with lesser components. This may reduce the overall bill of materials and the maintenance cost of a light sensor node. In addition to the power savings, the system of the present example may be flexible in terms of size of the solar cell that is used. The number of solar cells that can be used to harvest the solar energy can be reduced, trading off responsiveness and accuracy of the system with the cost of the system.

This example system is based on the premise that the number of output signals provided by the transmitter module represents the light intensity level and hence the control logic involved. The system maintains this consistency when it is not providing output signals, as such a situation implies that the light intensity is very low. In addition, the system does not affect the efficiency of the control as light control does not have to be fast. A further advantage of the system is that it may include a self-sustaining sensor node which does not require an external battery, thereby replacing the need to replace batteries which directly may contribute to maintenance costs. Consequently, the amount of maintenance required may be reduced thereby reducing the costs and increasing the operational life time of the system. Even when enough energy cannot be scavenged and no output signal is sent to a controller, the system is in a sense communicating with the controller indicating that the light level is below the threshold value required for providing an output signal. Therefore the example system may be more robust in its functionality compared to systems running on batteries. The example system can for example be used to control, based on the number and/or frequency of output signals provided by the transmitter module, the level of closing window blinds or the output level of artificial lighting.

The invention claimed is:

1. An ambient lighting control system, comprising:
   an energy storage element,
   a light energy collecting element arranged to charge the energy storage element,
   a transmitter arranged to provide, in response to becoming connected with the energy storage element, signal using energy stored by the energy storage element,
   switching circuitry arranged to connect the energy storage element to the transmitter in response to an energy stored by the energy storage element exceeding a threshold energy, so that a number of signals provided by the transmitter during a time interval is proportional to a light intensity at the light energy collecting element,
   a controller comprising a receiver arranged to receive the signal from the transmitter, and
   circuitry arranged to determine the number of signals received from the transmitter during the time interval, and to output a control signal based on the determined number of received signals for controlling an amount of ambient lighting.

2. An ambient lighting control system according to claim 1, wherein the switching circuitry is arranged to disconnect the energy storage element from the transmitter in response to the transmitter providing a signal to the controller.

3. An ambient lighting control system according to claim 2, wherein the switching circuitry is arranged to connect the energy storage element to the transmitter in response to an energy stored by the energy storage element exceeding a first threshold, and to disconnect the energy storage element from the transmitter in response to an energy stored by the energy storage element falling below a second threshold.

4. A ambient lighting control system according to claim 1, wherein the controller is arranged to output a control signal for reducing an amount of ambient lighting on a condition that the determined number of received signals exceeds a first threshold, and to output a control signal for increasing an amount of ambient lighting on a condition that the determined number of received signals falls below a second threshold.

5. A ambient lighting control system according to claim 1, wherein the controller is arranged to estimate a prevailing amount of ambient light using the determined number of received signals, output a control signal for reducing an amount of ambient lighting on a condition that the estimated amount of ambient light exceeds a first threshold value, and to output a control signal for increasing an amount of ambient lighting on a condition that the estimated actual ambient light level falls below a second threshold value.

6. A method performed in an ambient lighting control system, comprising the steps of:
   charging an energy storage element using a light energy collecting element,
   connecting a transmitter to the energy storage element in response to a stored energy exceeding a threshold energy,
   providing a signal from the connected transmitter to
   a controller of the ambient lighting control system using energy stored by the energy storage element,
   wherein the number of signals transmitted to the controller during a time interval is proportional to a light intensity at the light energy collecting element.

7. A method according to claim 6, further comprising the step of disconnecting the transmitter from the energy storage element in response to the transmitter providing the signal to the controller.

8. A method according to claim 6, wherein the steps of connecting and disconnecting the transmitter to and from the energy storage element comprises the steps of connecting the transmitter to the energy storage element in response to a stored energy exceeding a first threshold energy, and disconnecting the transmitter from the energy storage element in response to a stored energy falling below a second threshold energy.

* * * * *